US011058972B2

(12) United States Patent
Chau

(10) Patent No.: US 11,058,972 B2
(45) Date of Patent: Jul. 13, 2021

(54) LIQUID TREATMENT APPARATUS

(71) Applicants: Canpro Water Treatment Inc., Richmond Hill (CA); Yuk Bing Chan

(72) Inventor: Yiu Chau Chau, Hong Kong (CN)

(73) Assignee: Canpro Water Treatment Inc., Richmond Hill (CA)

( * ) Notice: Subject to any disclaimer, the term of this patent is extended or adjusted under 35 U.S.C. 154(b) by 0 days.

(21) Appl. No.: 16/706,202

(22) Filed: Dec. 6, 2019

(65) Prior Publication Data

US 2020/0114283 A1    Apr. 16, 2020

Related U.S. Application Data

(63) Continuation of application No. PCT/CN2017/087242, filed on Jun. 6, 2017.

(51) Int. Cl.
*B01D 21/24* (2006.01)
*C02F 1/52* (2006.01)
*C02F 1/00* (2006.01)

(52) U.S. Cl.
CPC .......... *B01D 21/2411* (2013.01); *C02F 1/006* (2013.01); *C02F 1/52* (2013.01);
(Continued)

(58) Field of Classification Search
CPC .... B01D 21/2411; B01D 21/24; B01D 35/04; B01D 35/00; C02F 1/006; C02F 1/52;
(Continued)

(56) References Cited

U.S. PATENT DOCUMENTS 3,801,492 A * 4/1974 King ................. F16L 55/04
                                                            204/671
5,540,848 A    7/1996 Engelhard
(Continued)

FOREIGN PATENT DOCUMENTS

CN           2506631        8/2002
CN         202671312        1/2013
(Continued)

OTHER PUBLICATIONS

English translated version JP H0724470 A, Jan. 1995, Yamamoto Satoshi.*
(Continued)

*Primary Examiner* — Robert Clemente
*Assistant Examiner* — Akash K Varma
(74) *Attorney, Agent, or Firm* — Hanley, Flight & Zimmerman, LLC

(57) ABSTRACT

Embodiments of this disclosure provide a liquid treatment apparatus. The liquid treatment apparatus comprises: a housing which is of a cylindrical shape and comprises an accommodating space; an inlet for a liquid to flow into the accommodating space; an outlet for the liquid to flow out of the accommodating space; a treatment medium used for treating the liquid contacting the treatment medium; and a spiral flow-guiding device making the liquid in the accommodating space flow in a spiral direction around an axis of the cylindrical shape at least before contacting the treatment medium or in contacting the treatment medium. An advantage of this disclosure exists in by making the liquid in the liquid treatment apparatus flow in a spiral direction before contacting the treatment medium, natural energy in the liquid is increased, thereby improving a capability of the treatment medium in treating the liquid.

6 Claims, 13 Drawing Sheets

(52) U.S. Cl.
CPC ............... *C02F 2001/5218* (2013.01); *C02F 2301/026* (2013.01); *C02F 2303/22* (2013.01)

(58) Field of Classification Search
CPC ...... C02F 1/00; C02F 1/28; C02F 1/46; C02F 2001/5218; C02F 2301/026; C02F 2303/22
USPC ......................................................... 210/286
See application file for complete search history.

(56) References Cited

U.S. PATENT DOCUMENTS

| | | | | |
|---|---|---|---|---|
| 6,090,285 | A | * | 7/2000 | Chau .................... B01D 24/008 210/284 |
| 9,527,015 | B2 | | 12/2016 | Chau |
| 2013/0056402 | A1 | * | 3/2013 | Chau ...................... B01D 29/58 210/223 |
| 2013/0068675 | A1 | * | 3/2013 | Chau .................. B01D 24/4631 210/108 |
| 2015/0196859 | A1 | * | 7/2015 | Levitt .................. B01D 29/902 210/767 |
| 2017/0087484 | A1 | | 3/2017 | Chau |

FOREIGN PATENT DOCUMENTS

| | | | |
|---|---|---|---|
| CN | 104176787 | | 12/2014 |
| DE | 202011051098 | | 11/2011 |
| EP | 2543640 | | 1/2013 |
| JP | H07-24470 | | 1/1995 |
| JP | H0724470 A | * | 1/1995 ............... C02F 1/28 |
| JP | H07-155748 | | 6/1995 |

OTHER PUBLICATIONS

International Searching Authority, International Search Report, issued in connection with International Application No. PCT/CN2017/087242, dated Jan. 26, 2018, 4 pages.

Technical Rules W 512, Sep. 1996, Testing procedures to evaluate the effectiveness of water conditioning devices for the reduction of scaling, 9 pages.

European Patent Office, Extended European Search Report, issued in connection with European Patent Application No. 17913010.9 dated Dec. 10, 2020, 9 pages.

\* cited by examiner

LIQUID TREATMENT APPARATUS

CROSS REFERENCE TO RELATED APPLICATION

This present application is a continuation of International Application No. PCT/CN2017/087242, filed on Jun. 6, 2017, which is hereby incorporated by reference in its entirety.

TECHNICAL FIELD

This disclosure relates to the field of fluid treatment technologies, and in particular to a liquid treatment apparatus.

BACKGROUND

In today's cities, municipal water is transported through unnaturally distributed pipe systems, destroying the original structure of the water and losing its natural health and vitality. In other words, the introduction of water into pipelines limits the water's ability to flow, thereby removing the natural energy in the water. As a result, the structure of normal tap water consists of a large number of interconnected water molecules, which is unlike micro-clustered or structured water like natural water.

Advantages of micro-clustered or structured water are that: it is easy to be absorbed and has better hydration effect; the taste, feel and quality of water are higher; it increases and activates oxygen dissolved in water, making water more active; solubility of water is significantly increased; and more natural energy exists in water.

In hard water areas, domestic ion exchange water softeners are widely used. However, brines discharged from the domestic ion exchange water softeners contain relatively higher concentration of ions, such as sodium, chloride, magnesium, and calcium. These brines are difficult to be reused in, for example, agricultural irrigation, groundwater supply or cooling tower. A brine-free regulating device may be used to reduce the salinity load of the reclaimed water and improve its quality for reuse. In some alternative devices, scaling may be effectively prevented by some other possible means.

A method of physical water treatment to prevent scale may be, for example, treating water with a treatment medium to convert soluble calcium in the water into non-sticky calcium carbonate microcrystals suspended in the water. When water enters an environment that is more prone to scale-forming, such as water heaters, microscopic crystals provide the lowest energy surface for crystallization. Therefore, scales are formed on microscopic crystals suspended in water, so as to prevent scales from being formed on the surface of the water heater. A template-assisted crystallization (TAC) technology is one of the technologies used for forming non-sticky microcrystals.

In a prefilter of a water treatment unit, water may be filtered by using a medium based on, for example, a NextScaleStop technology, which may be a medium based on template-assisted crystallization (TAC) technology, or a medium with the same or similar principle as the template-assisted crystallization (TAC) technology, or other granular media with other purposes, the other granular media being, for example, a medium with a trade name of silecte, or Quantum Disinfection.

Another method of physical water treatment for preventing scale may be, for example, a scale induction method, in which scale may be generated on an electrode by induction of an electric field, thereby reducing a potential of scale formation in water. Electrically induced precipitation (EIP) is an example of the scale induction technology.

In addition, an electromagnetic device may be used instead of an electrode to generate microscopic crystals. Other alternative technologies for ion exchange may include devices using capacitors or devices using electro-deionization. These devices may remove almost all ions with the same efficiency, but a water recovery rate is relatively low.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that if the natural energy in the water may be returned to the tap water before the tap water comes into contact with the treatment medium, the treatment effect of the treatment medium on the water will be significantly improved.

In the embodiments of this disclosure, by making a liquid in a liquid treatment apparatus flow in a spiral direction before contacting the treatment medium, a part of the natural energy may be returned to the liquid, thereby improving the treatment capacity of the treatment medium for the liquid.

An embodiment of this disclosure provides a liquid treatment apparatus, including:

a housing which is of a cylindrical shape and includes an accommodating space;

an inlet for a liquid to flow into the accommodating space;

an outlet for the liquid to flow out of the accommodating space;

a treatment medium used for treating the liquid contacting the treatment medium; and spiral flow-guiding devices making the liquid in the accommodating space flow in a spiral direction around an axis of the cylindrical shape at least before contacting the treatment medium or in contacting the treatment medium;

the accommodating space at least includes a first portion and a second portion, the first portion being used to set the spiral flow-guiding devices so that the liquid flows in the spiral direction around the axis of the cylindrical shape, and the second portion being used to set the treatment medium to treat the liquid.

An advantage of the embodiments of this disclosure exists in that by making the liquid in the liquid treatment apparatus flow in a spiral direction, natural energy in the liquid is increased, thereby improving a capability of the treatment medium in treating the liquid.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not correspondingly in scope. Rather, the disclosure includes all changes, modifications and equivalents coming within the terms of the appended claims.

In the embodiments of this disclosure, the housing of the liquid treatment apparatus may be of a cylindrical shape, a direction of an axis of the cylindrical shape is referred to as an axial direction, and a direction perpendicular to the axial direction is referred to as a radial direction. It should be noted that the definitions of the above directions are for the convenience of explanation, and are not intended to limit orientations of the liquid treatment apparatus in manufacture and use.

Embodiment 1

Embodiment 1 of this disclosure provides a liquid treatment apparatus, which is used to treat a liquid.

Figure 1:
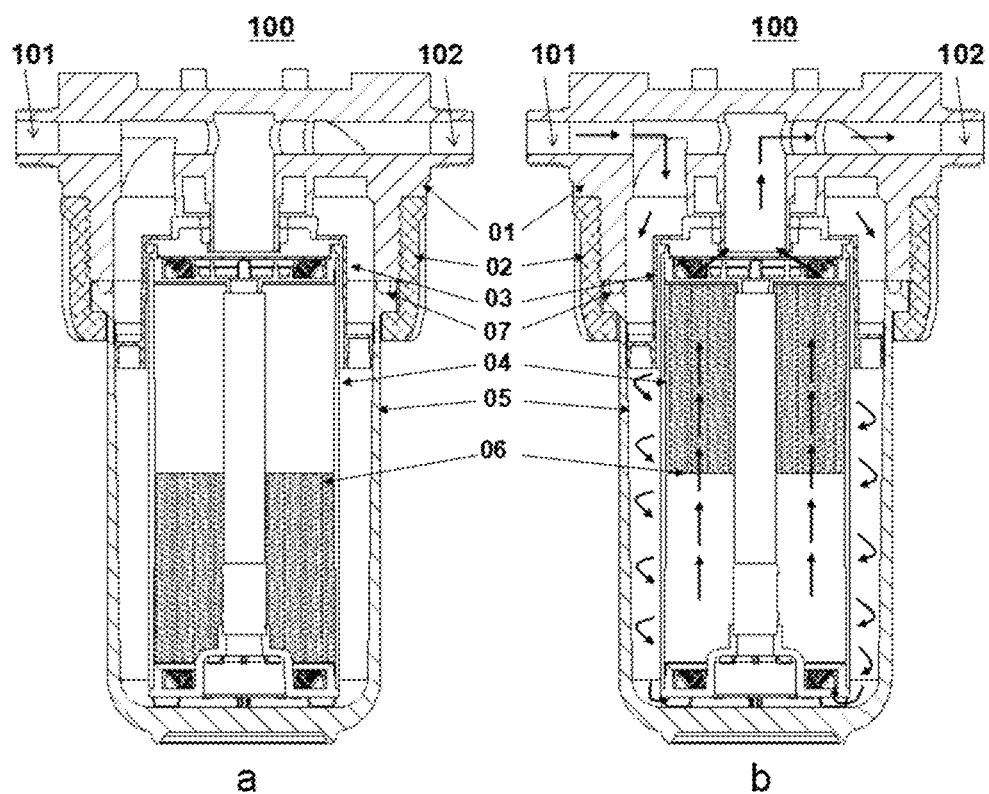
FIG. 1 is an axial cross-sectional view of the liquid treatment apparatus of Embodiment 1 of this disclosure.
Figure 2:
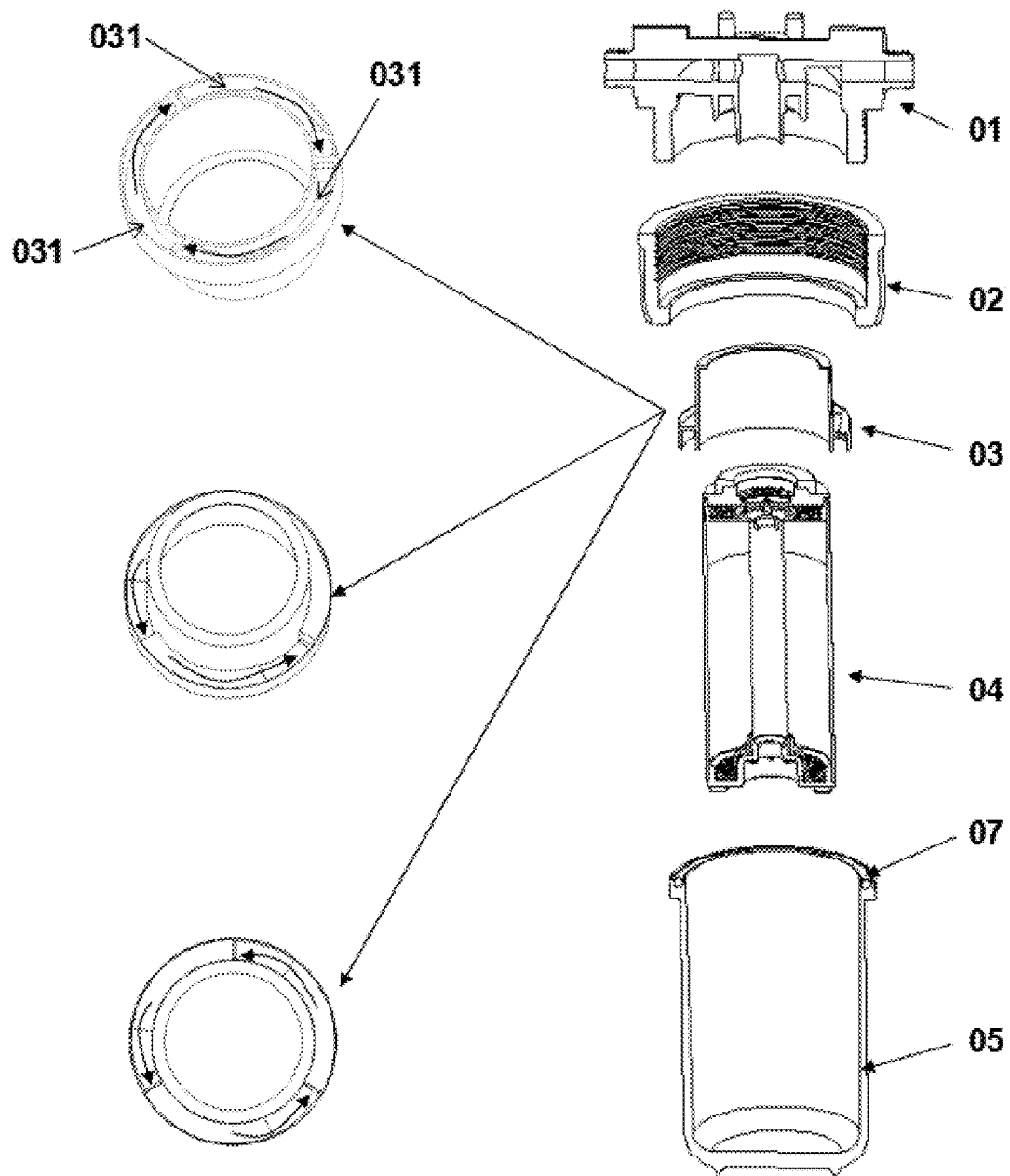
FIG. 2 is an explosive view of the liquid treatment apparatus of Embodiment 1 of this disclosure.

In FIG. 1, a is an axial cross-sectional view of the liquid treatment apparatus of the embodiment of this disclosure, b is a schematic diagram of the liquid treatment apparatus in (a in which a liquid flow direction is added, and FIG. 2 is an explosive view of the liquid treatment apparatus of this embodiment.

As shown in FIGS. 1 and 2, a liquid treatment apparatus 100 may include a housing 05, an inlet 101, an outlet 102, a treatment medium 06, and a spiral flow-guiding device 03.

The housing 05 may be of a cylindrical shape and includes an accommodating space inside; the inlet 101 allows a liquid to flow into the accommodating space; the outlet 102 allows the liquid to flow out of the accommodating space; the treatment medium 06 is used for treating the liquid contacting the treatment medium 06; and the spiral flow-guiding device 03 makes the liquid in the accommodating space flow in a spiral direction around the axial direction of the cylindrical housing 05.

In this embodiment, by making the liquid in the liquid treatment apparatus to flow in the spiral direction, part of the natural energy may be returned to the liquid, thereby improving a treatment capability of the treatment medium for the liquid.

In this embodiment, the accommodating space may include at least a first portion and a second portion, the first portion being used to set the spiral flow-guiding device 03 so that the liquid flows in the spiral direction around the axis of the cylindrical shape, and the second portion being used to set the treatment medium 06 to treat the liquid.

In this embodiment, the first portion and the second portion may be arranged to be spaced apart from each other in the axial direction, or may be arranged to be at least partially overlapped in the axial direction.

In this embodiment, the liquid entering the accommodating space may be first guided by the spiral flow-guiding device 03 to flow in the spiral direction in the liquid flow path, and then contact the treatment medium 06; or the liquid entering the accommodating space may be guided by the spiral flow-guiding device 03 at a position in contact with the treatment medium 06 to flow in the spiral direction; or the liquid entering the accommodating space may flow in the spiral direction before contacting the treatment medium 06, and may continue to be guided at the position in contact with the treatment medium 06 to flow in the spiral direction.

A bottom view, a perspective view and a top view of a spiral flow-guiding device 03 are sequentially shown from the top to the bottom at the left side of FIG. 2. As shown in FIG. 2, the spiral flow-guiding device 03 may include a flow-guiding surface 031, which may be inclined with respect to the axial direction, so that the liquid is guided by the flow-guiding surface 031 to move in the spiral direction shown by a circular arrow in FIG. 2. In this embodiment, the spiral flow-guiding device 03 may further include a flow-guiding groove (not shown in the figure), which allows the liquid to flow, hence, the liquid may pass through the flow-guiding groove and flow from the top of the spiral flow-guiding device 03 to the lower part of the flow-guiding device 03.

In this embodiment, as shown in FIGS. 1 and 2, the liquid treatment apparatus 100 may further include a first inner cylinder 04, which may be located in the accommodating space.

In this embodiment, at least one spiral flow-guiding device 03 may be disposed between the first inner cylinder 04 and the housing 05, and the at least one spiral flow-guiding device 03 may hold the first inner cylinder 04 so that the axis of the inner cylinder 04 is along the axial direction. For example, the outermost periphery in the radial direction of the spiral flow-guiding device 03 may abut against an inner wall of the housing 05, and the innermost periphery in the radial direction of the spiral flow-guiding device 03 may abut against an outer wall of the first inner cylinder 04, which may prevent the first inner cylinder 04 from being inclined with respect to the axial direction, thereby preventing the first inner cylinder 04 from being damaged during installation the liquid treatment apparatus 100.

As shown in FIG. 1, in this embodiment, a first liquid flow path is formed between the first inner cylinder 04 and the housing 05, and the liquid flows in a spiral direction at least in the first liquid flow path. Furthermore, a second liquid flow path may be formed in an inner space of the first inner cylinder 04. For example, as shown in b of FIG. 1, the liquid flowing in from the inlet 101 is guided by the flow-guiding surface of the spiral flow-guiding device 03, and enters into the first liquid flow path after passing through the flow-guiding groove of the spiral flow-guiding device 03. In the first flow path, the liquid flows in the spiral direction, enters into the first inner cylinder 04 from the bottom of the first inner cylinder 04, and flows along the second liquid flow path. In the first inner cylinder 04, the liquid contacts the medium 06, and is processed by the medium 06, and the processed liquid flows out of the accommodating space via the outlet 102.

In this embodiment, the medium 06 may be provided in the first inner cylinder 04. However, this embodiment is not limited thereto, and the medium 06 may not be provided in the first inner cylinder. Furthermore, in FIG. 1, the lower half of the medium 06 is shown in a of FIG. 1, and the upper half of the medium 06 is shown in b of FIG. 1; however, this is for simplicity of illustration only, and an actual situation is that the medium 06 includes both the upper half and the lower half.

In this embodiment, the liquid treatment apparatus 100 may further include second inner cylinders (not shown) provided at a radially inner side of the first inner cylinder 04, at least one spiral flow-guiding device may be provided between the first inner cylinder and the second inner cylinders, a third liquid flow path can be formed between the first inner cylinder and the second inner cylinders, a fourth liquid flow path can be formed inside the second inner cylinders, and the third liquid flow path and the fourth liquid flow path being a part of the second liquid flow path. Hence, the length of the paths through which the liquid flows in the accommodating space may be extended, thereby further increasing natural energy of the liquid.

In this embodiment, the number of the second inner cylinders may be more than two, the second inner cylinders may be sequentially nested in the radial direction, and more liquid flow paths may be formed between two radially neighboring second inner cylinders. Hence, the length of the paths through which the liquid flows in the accommodating space may be extended, thereby further increasing natural energy of the liquid.

In this embodiment, radial dimensions of the first inner cylinder 04 and the second inner cylinders may be unevenly distributed in the axial direction. Hence, a flow rate of the liquid in the liquid flow path varies as the radial dimensions vary, thereby making the flow rate of the liquid experience more variations, and further increasing natural energy of the liquid.

In this embodiment, the liquid treatment apparatus 100 further includes a flow reducer (not shown) for changing a flow cross section of the liquid flow paths in the liquid treatment apparatus, thereby further increasing natural energy of the liquid.

In this embodiment, as shown in FIGS. 1 and 2, the liquid treatment apparatus 100 may further include an upper cover 01, a nut 02 and a seal ring 07. The inlet 101 and the outlet 102 may be provided on the upper cover 01, the upper cover 01 and the housing 05 may be connected by the nut 02, and the sealing ring 07 may be of an O-ring for sealing the connection of the upper cover 01 and the housing 05.

In this embodiment, the treatment medium 06 may be a medium based on the template-assisted crystallization (TAC) technology, or a medium having the same or similar principle as template-assisted crystallization (TAC) technology, or other granular media with other purposes, the other granular media being, for example, a medium with a trade name of silecte.

Figure 3:
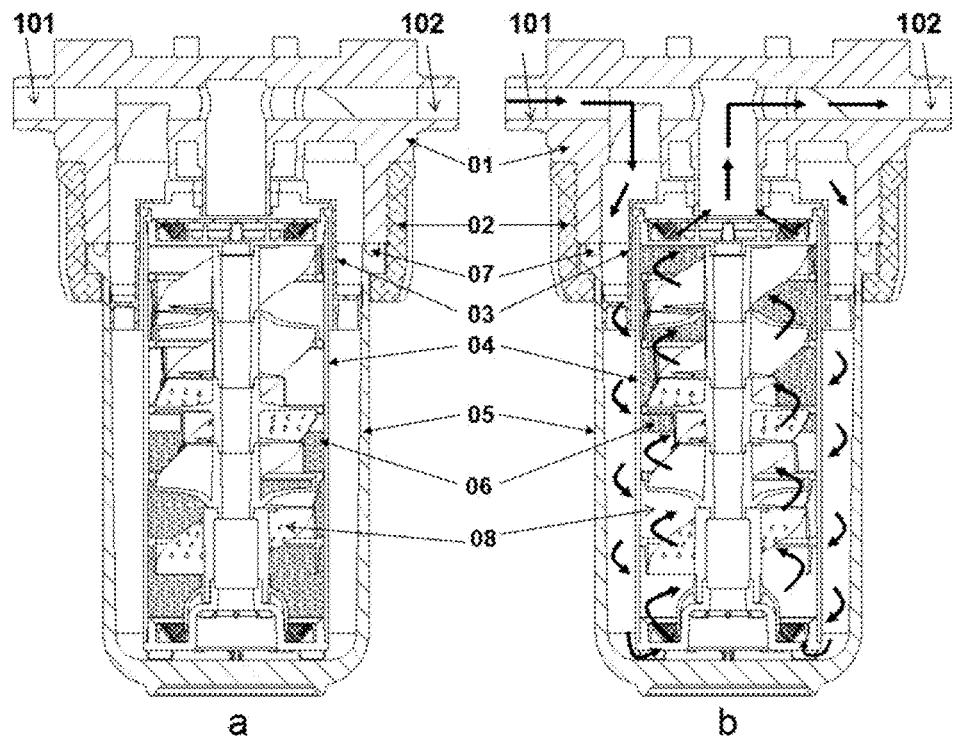
FIG. 3 is another axial cross-sectional view of the liquid treatment apparatus of Embodiment 1 of this disclosure.

In FIG. 3, a is another axial cross-sectional view of the liquid treatment apparatus of this embodiment, and b is a schematic diagram of the liquid treatment apparatus in a in which a liquid flow direction is added. Explanations of parts having the same reference number as those in FIG. 1 will be omitted, and differences therebetween shall be described only.

As shown in FIG. 3, in this embodiment, the liquid treatment apparatus 100 may further include a baffle 08. The baffle 08 may have a surface inclined with respect to the axial direction, thereby guiding the liquid to flow in the second flow path in the spiral direction, thereby further increasing natural energy of the liquid. The baffle 08 may be, for example, a spiral baffle. Furthermore, the treatment medium 06 may be in contact with the baffle 08. Therefore, the treatment medium 06 may be self-cleaned by friction or impact between the treatment medium 06 and the baffle 08.

Figure 4:
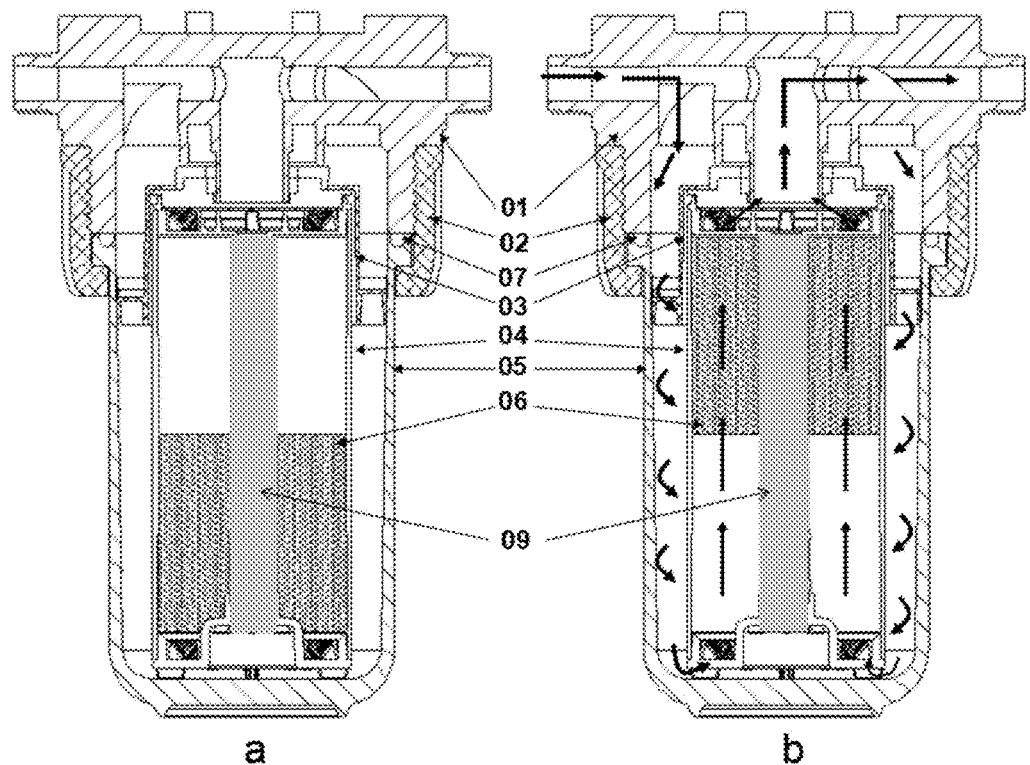
FIG. 4 is a further axial cross-sectional view of the liquid treatment apparatus of Embodiment 1 of this disclosure.

In FIG. 4, a is a further axial cross-sectional view of the liquid treatment apparatus of this embodiment, and b is a schematic diagram of the liquid treatment apparatus in a in which a liquid flow direction is added. Explanations of parts having the same reference number as those in FIG. 1 will be omitted, and differences therebetween shall be described only.

As shown in FIG. 4, in this embodiment, the liquid treatment apparatus 100 may further include a magnetic unit 09, which may be located in the accommodating space, for example, at a center of the first inner cylinder 04. In this embodiment, the magnetic unit 09 may also be provided outside the housing 05, or the magnetic unit 09 may be provided both in the accommodating space and outside the housing 05.

When the liquid flows in the accommodating space, a motion cutting the magnetic field of the magnetic unit 09 may be generated, thereby generating electromagnetic energy in the liquid; and as particle surfaces of the treatment medium 06 may also have charges, a treatment effect of the treatment medium 06 on a liquid having electromagnetic energy may be improved.

Figure 5:
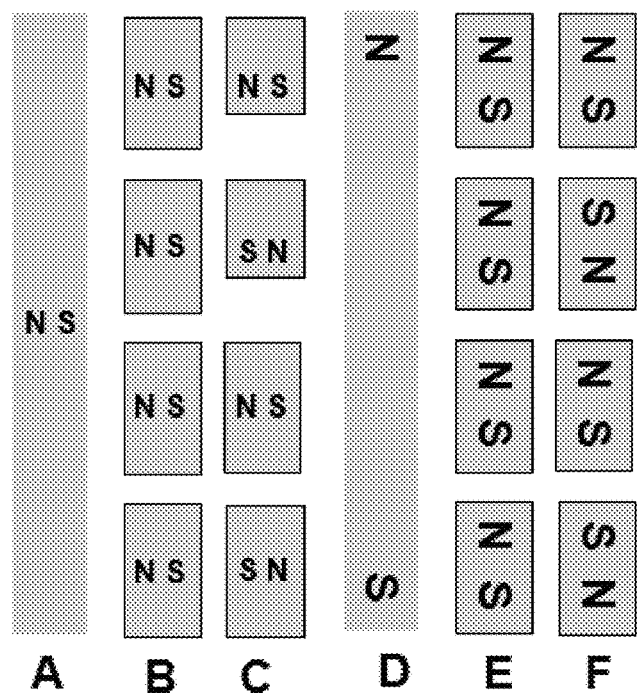
FIG. 5 is a schematic diagram of configuration forms of a magnetic unit of Embodiment 1 of this disclosure.

FIG. 5 is a schematic diagram of configuration forms of the magnetic unit of this embodiment. As shown in FIG. 5, A-F respectively show different configuration forms of the magnetic unit 09. This embodiment may not be limited to this, and the magnetic unit 09 may also adopt other configuration forms. Furthermore, the magnetic unit 09 may be of a rod type, a bar type, a cylindrical type, or other types.

Figure 6:
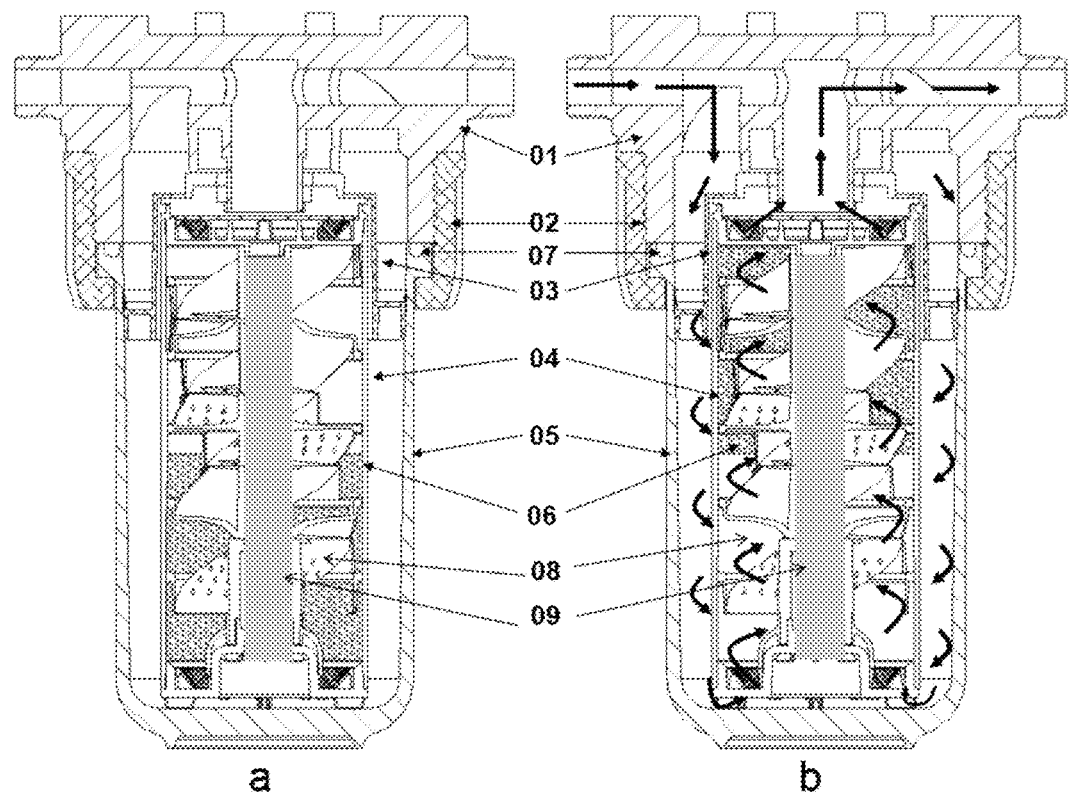
FIG. 6 is a yet further axial cross-sectional view of the liquid treatment apparatus of Embodiment 1 of this disclosure.

In FIG. 6, a is a yet further axial cross-sectional view of the liquid treatment apparatus of this embodiment, and b is a schematic diagram of the liquid treatment apparatus in a in which a liquid flow direction is added. The liquid treatment device of FIG. 6 is a combination of those shown in FIG. 3 and FIG. 4, that is, it includes both the magnetic unit 09 and the baffle 08, thus, a time of contacting the magnetic field of the magnetic unit 09 by the liquid moving in the spiral direction guided by the baffle 08 is extended, thereby generating more electromagnetic energy in the liquid.

Reference may be made to the description of related components in FIG. 1, FIG. 3 and FIG. 4 for description of the components in FIG. 6, which shall not be described herein any further.

In this embodiment, by making the liquid in the liquid treatment apparatus flow in a spiral direction before or in contacting the treatment medium, a part of natural energy may return into the liquid, thereby improving a capability of the treatment medium in treating the liquid. Moreover, by providing the first inner cylinder and the second inner cylinder, the length of the liquid flow path is increased, and natural energy in the liquid may also be increased; and by providing the flow reducer, an area of the liquid flow path may be changed, which may increase natural energy in the liquid. Furthermore, by providing the magnetic unit, the treatment capability of the treatment medium for the liquid may further be improved.

In this embodiment, the structure the liquid treatment apparatus is described by taking that both the inlet and the outlet are provided with an upper cover as an example. However, this embodiment is not limited thereto; for example, positions of the inlet and the outlet, the positions of the liquid treatment apparatus and the number of the second inner cylinders may be changed according to different implementations.

Embodiment 2

Embodiment 2 of this disclosure provides a liquid treatment apparatus, which is used to treat a liquid.

In Embodiment 2, this disclosure shall be described by taking an inline liquid treatment apparatus having an inlet and an outlet respectively provided at two ends of a housing as an example.

Figure 7:
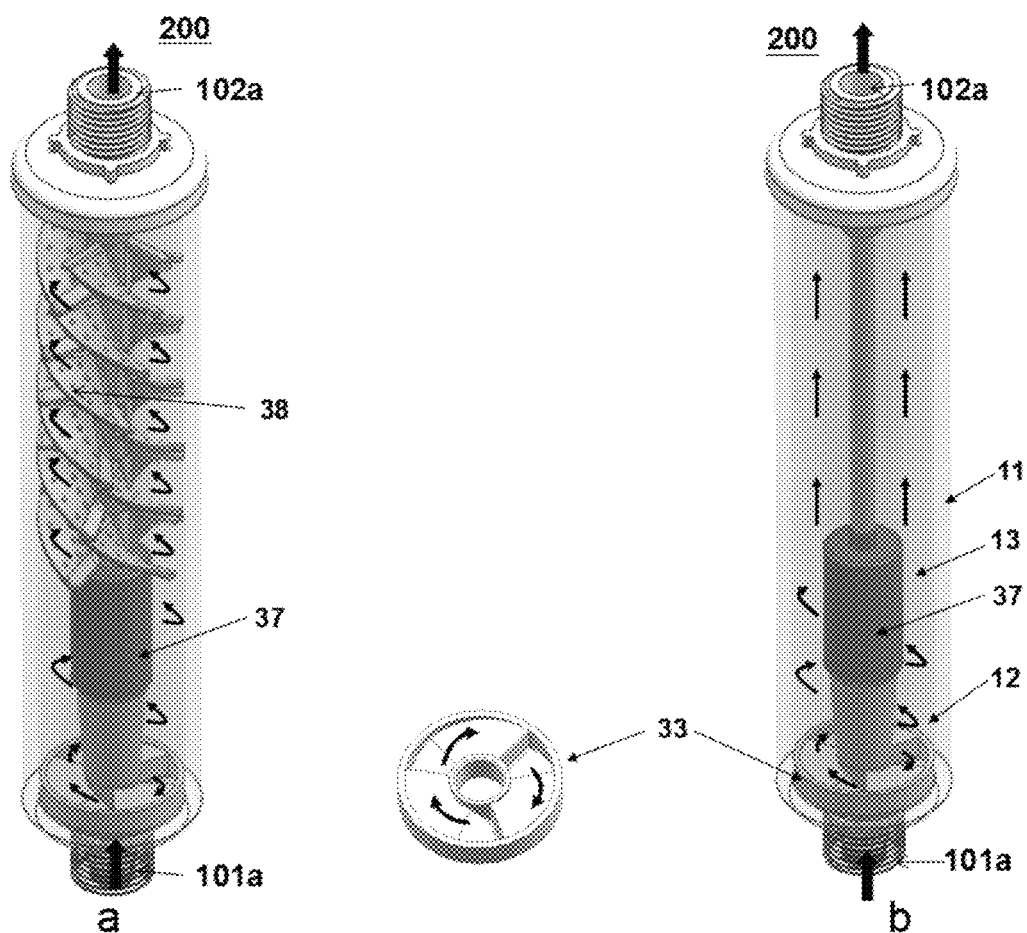
FIG. 7 is a perspective view of the liquid treatment apparatus of Embodiment 2 of this disclosure.

In FIG. 7, a is a perspective view of the liquid treatment apparatus of Embodiment 2 of this disclosure, and b is another perspective view of the liquid treatment apparatus of Embodiment 2 of this disclosure.

As shown in b of FIG. 7, a liquid treatment apparatus 200 may include a housing 11, an inlet 101a, an outlet 102a, a treatment medium (not shown), and a spiral flow-guiding device 33.

The housing 11 may be of a cylindrical shape and includes an accommodating space inside; the inlet 101a allows a liquid to flow into the accommodating space; the outlet 102a allows the liquid to flow out of the accommodating space; the treatment medium is used for treating the liquid contacting the treatment medium; and the spiral flow-guiding device 33 makes the liquid in the accommodating space flow in a spiral direction around the axial direction of the housing 11.

In this embodiment, the accommodating space may include at least a first portion and a second portion, the first portion being used to set the spiral flow-guiding device so that the liquid flows in the spiral direction around the axis of the cylindrical shape, and the second portion being used to set the treatment medium to treat the liquid.

In this embodiment, the first portion and the second portion may be arranged to be spaced apart from each other in the axial direction, or may be arranged to be partially overlapped in the axial direction.

In this embodiment, the inlet 101a and the outlet 102a are respectively disposed at two ends of the cylindrical housing 11 in the axial direction, hence, the liquid treatment apparatus 200 becomes an inline filter.

As shown in b of FIG. 7, the spiral flow-guiding device 33 may have a flow-guiding surface inclined with respect to the axial direction and a flow-guiding groove through which the liquid passes. The liquid entering into the accommodating space of the housing 11 from the inlet 101a passes through the flow-guiding groove, and starts to move in the spiral direction at a position 12 guided by the flow-guiding surface of the spiral flow-guiding device 33. The movement in the spiral direction ends at a position 13, and then the fluid continues to flow toward the outlet 102a.

In this embodiment, by making the liquid in the liquid treatment apparatus flow in a spiral direction before contacting the treatment medium or in contacting the treatment medium, a part of natural energy is returned into the liquid, thereby improving the capability of the treatment medium in treating the liquid.

As shown in b of FIG. 7, in this embodiment, the liquid treatment apparatus 200 may further include a flow reducer 37, which may change a flow cross-section of the liquid flow path in the treatment apparatus 200 and change flow rate of the liquid, thereby further increasing the natural energy of the liquid. For example, the flow reducer 37 may be of a cylindrical shape, and the flow cross section of the liquid flow path between the flow reducer 37 and the housing 11 may be set to be smaller than the flow cross section at the position 12, thereby making the flow rate of the liquid changed.

An only difference between a and b in FIG. 7 is that in a of FIG. 7, the liquid treatment apparatus 200 may further include a baffle 38. The baffle 38 may have a surface inclined with respect to the axial direction, thereby guiding the liquid to flow in the spiral direction, thereby further increasing natural energy of the liquid. The baffle 38 may be, for example, a spiral baffle. And furthermore, the treatment medium may be in contact with the baffle 38. Therefore, the treatment medium may be self-cleaned by friction or impact between the treatment medium and the baffle 38.

Figure 8:
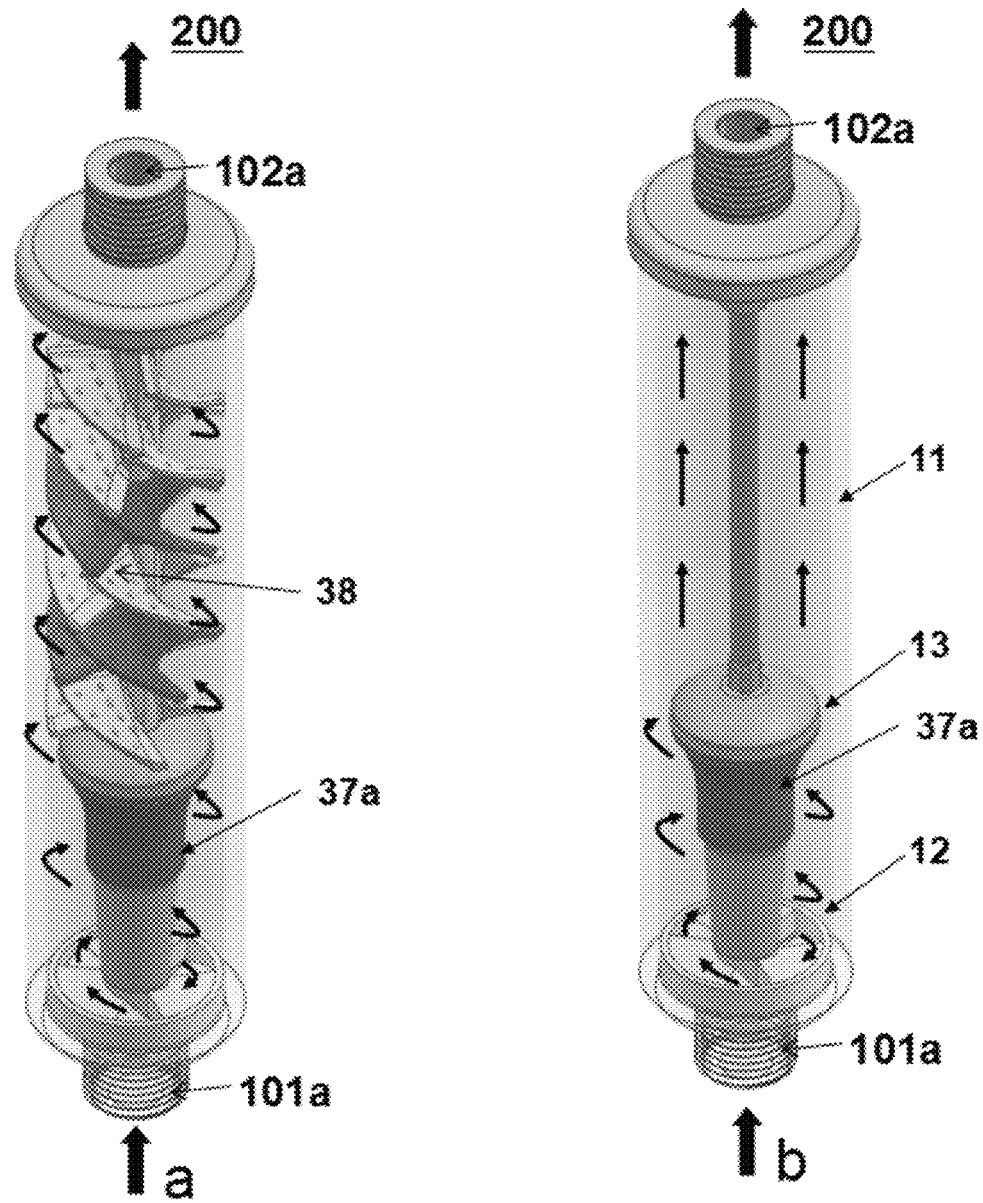
FIG. 8 is another perspective view of the liquid treatment apparatus of Embodiment 2 of this disclosure.

In FIG. 8, a is another perspective view of the liquid treatment apparatus of Embodiment 2 of this disclosure, and b is a further perspective view of the liquid treatment apparatus of Embodiment 2 of this disclosure. A and b of FIG. 8 are respectively obtained based on improvement of a and b of FIG. 7. An only difference between FIG. 8 and FIG. 7 is that a and b of FIG. 8 use a reducer 37a instead of the reducer 37 in a and b of FIG. 7.

In FIG. 8, a radial cross-sectional area of the flow reducer 37a changes in the axial direction. The larger the radial cross-sectional area is, the smaller the radial area of the liquid flow path between the flow reducer 37a and the housing 11 is, and the higher the flow rate of the liquid. For example, the closer the radial cross-sectional area of the reducer 37a is to the outlet 102a, the smaller the radial cross-sectional area of the liquid flow path, and the higher the flow rate of the liquid, that is, the flow rate of the liquid at the position 13 is higher than that at the position 12. Hence, a tornado effect may be generated in the liquid around the flow reducer 37a, so that the liquid may obtain more natural energy.

Figure 9:
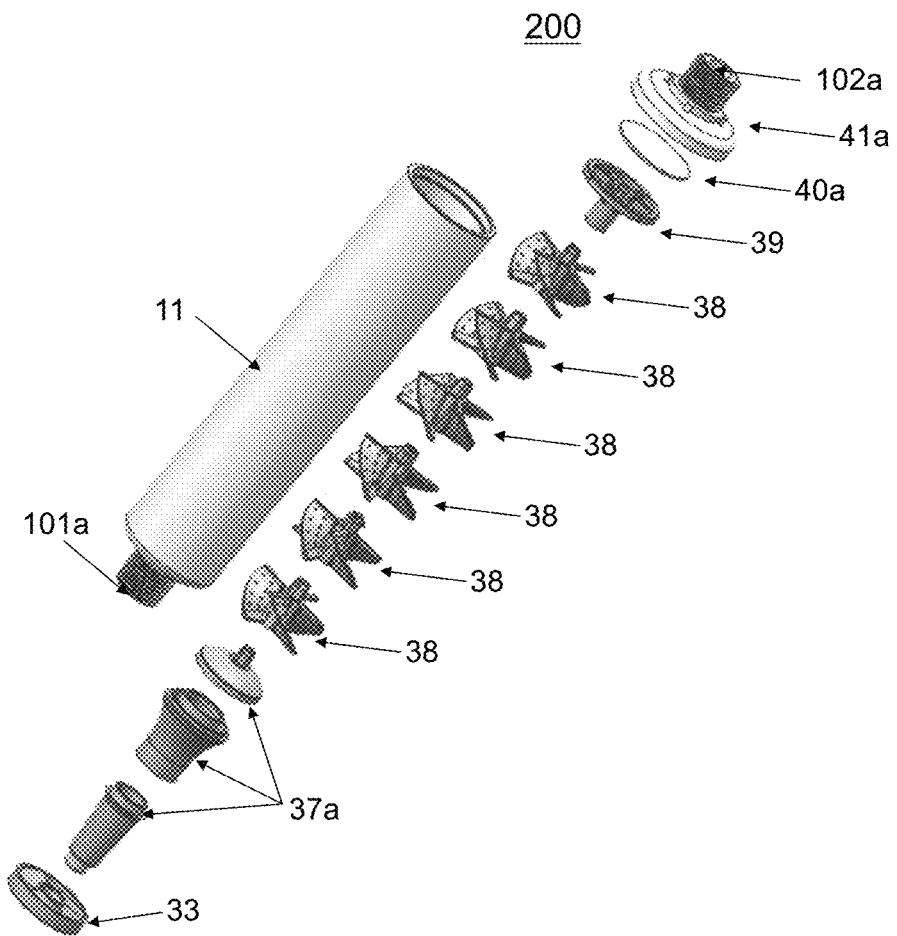
FIG. 9 is an explosive view of FIG. 8.

FIG. 9 is an exploded view of a of FIG. 8. As shown in FIG. 9, the liquid treatment apparatus 200 includes a housing 11, spiral flow-guiding devices 33, a flow reducer 37a, and a post filter holder 39, post filter 40a, an upper cover 41a, a medium (not shown) provided in the housing 11, an inlet 101a provided in the housing 11, and an outlet 102a in the upper cover 41a.

In this embodiment, the post filter 40a is used for post-filtration of the liquid treated by the medium, and the post filter holder 39 is used to hold the post filter 40a.

Figure 10:
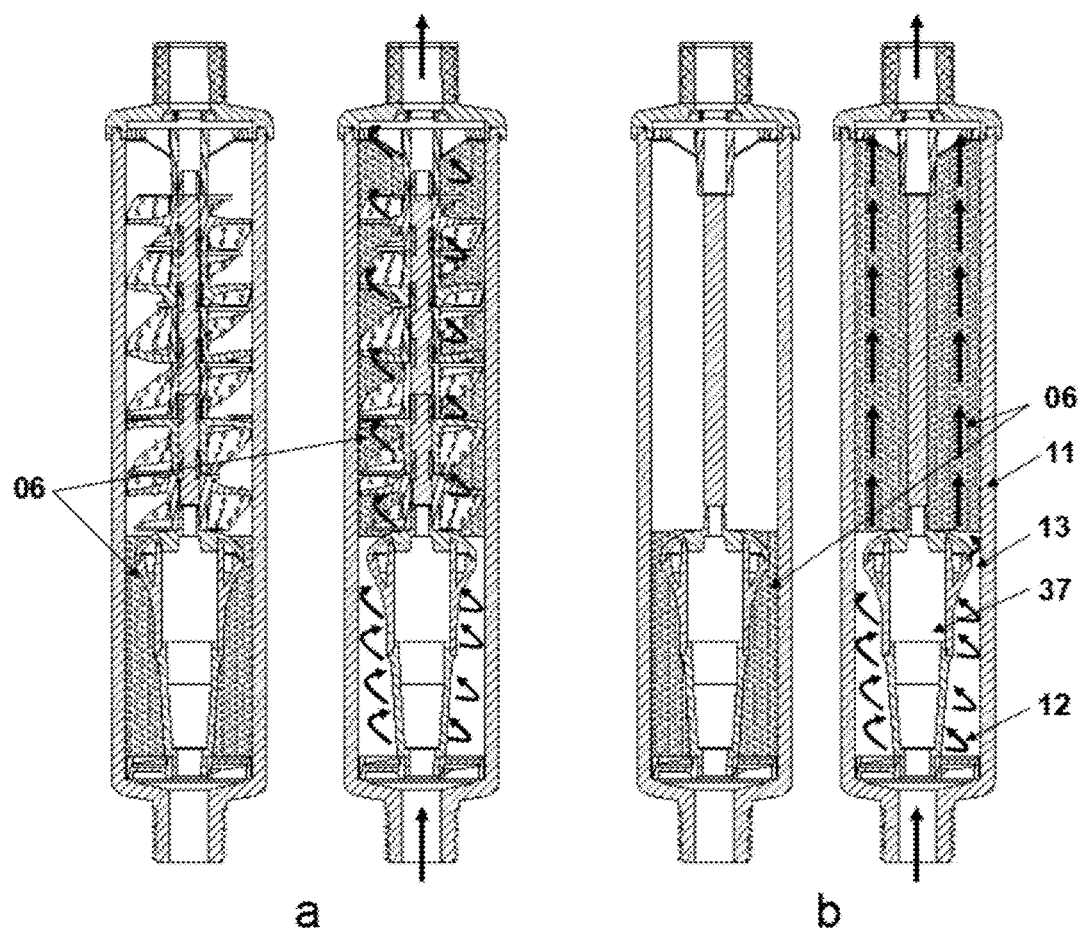
FIG. 10 is an axial cross-sectional view of FIG. 8.

In FIG. 10, a is an axial cross-sectional view of a of FIG. 8, and b of FIG. 10 is an axial cross-sectional view of b of FIG. 8. In FIG. 10, the treatment medium 06 is shown. Meanings of other components in FIG. 10 are identical to those in FIG. 8 and FIG. 9, which shall not be described herein any further.

In a and b of FIG. 10, the spiral flow-guiding device 33 makes the liquid move in the spiral direction and flows to the outlet. Furthermore, in a of FIG. 10, due to presence of the baffle 38, the liquid may also move in the spiral direction under an action of the baffle 38.

Figure 11:
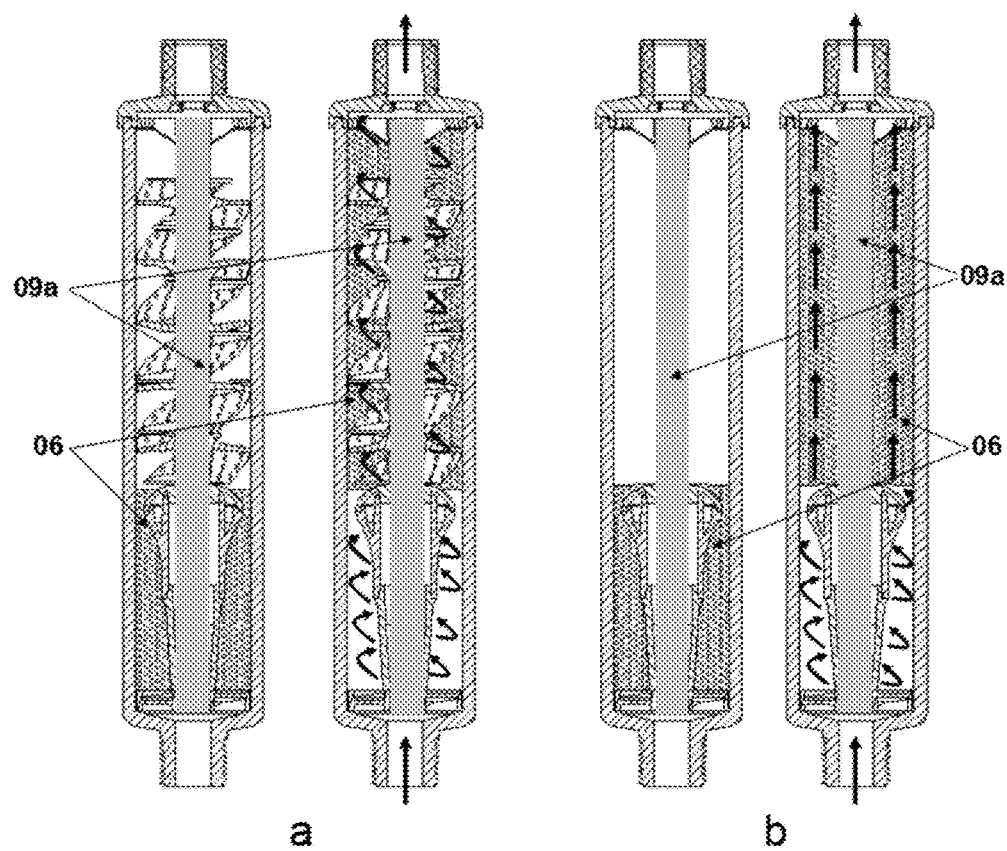
FIG. 11 is another axial cross-sectional view of the liquid treatment apparatus of Embodiment 2 of this disclosure.

In FIG. 11, a is another axial cross-sectional view of the liquid treatment apparatus of this embodiment, and b is a further axial cross-sectional view of the liquid treatment apparatus of this embodiment. An only difference between FIG. 11 and FIG. 10 is that in FIG. 11, a magnetic unit 09a is provided in the liquid treatment apparatus.

In this embodiment, the magnetic unit 09a may be located in the accommodating space, or may be located outside the housing 11, and also, the magnetic unit 09a may be partially located in the accommodating space and partially outside the housing 11.

Figure 12:
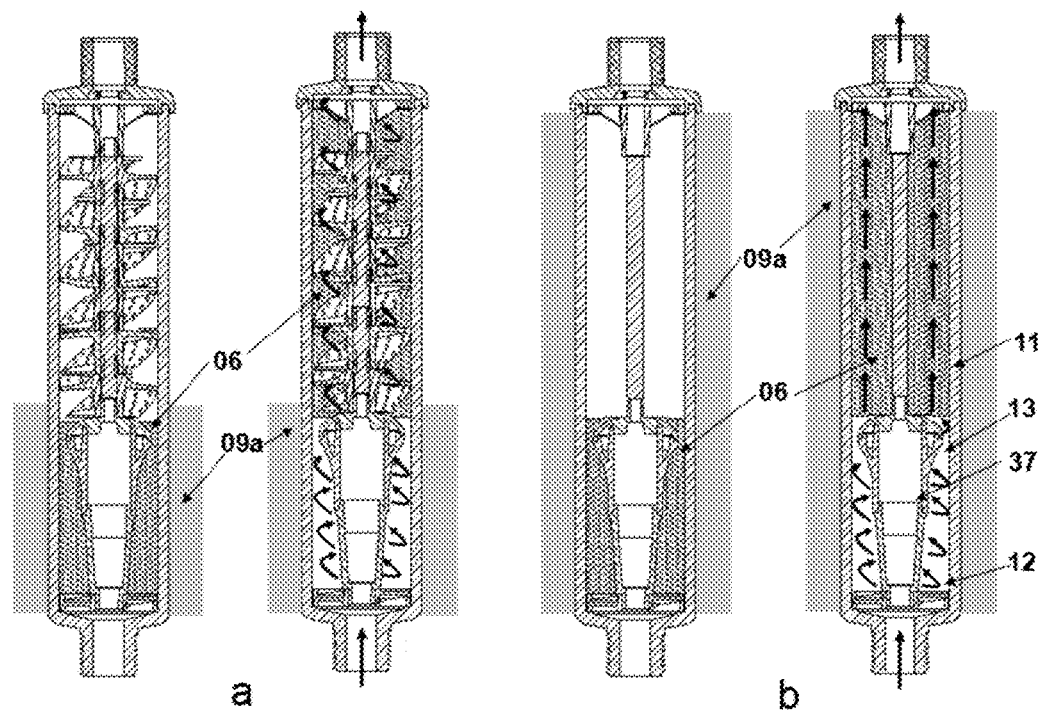
FIG. 12 is a schematic diagram of another configuration position of a magnetic unit of Embodiment 2 of this disclosure.

In FIG. 12, a and b respectively show another configuration position of the magnetic unit 09a. However, this embodiment is not limited thereto, and the magnetic unit 09a may also be provided at positions.

Figure 13:
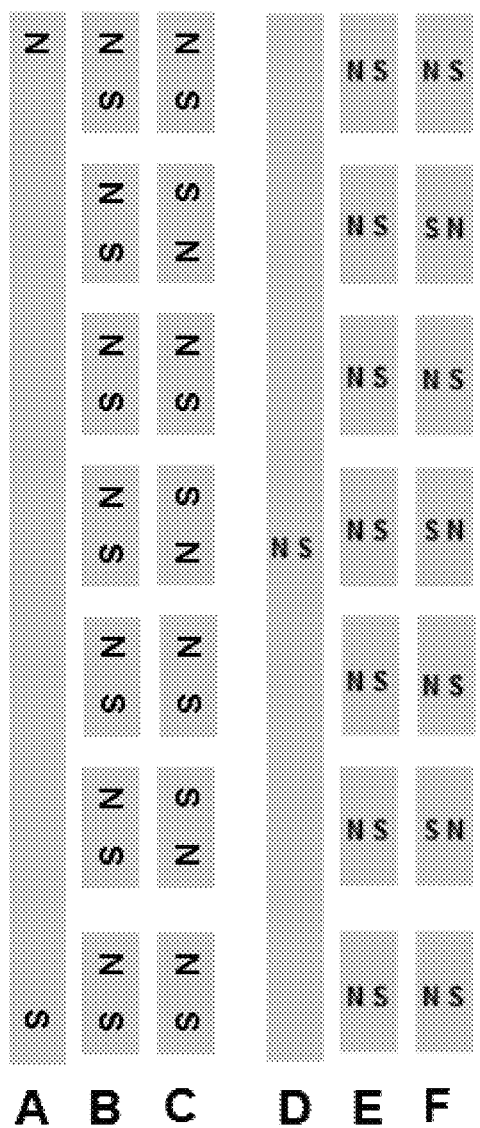
FIG. 13 is a schematic diagram of a configuration form of a magnetic unit of Embodiment 2 of this disclosure.

FIG. 13 is a schematic diagram of configuration forms of the magnetic unit 09a of this embodiment. As shown in FIG. 13, A-F respectively show different configuration forms of the magnetic unit 09a. However, this embodiment is not limited thereto, and the magnetic unit 09a may also adopt other configuration forms.

In this embodiment, the magnetic unit 09a may be may be of a rod type, a bar type, a cylindrical type, or other types.

Reference may be made to the description of the magnetic unit 09 in Embodiment 1 for description of the magnetic unit 09a, which shall not be described herein any further.

Furthermore, in this embodiment, the liquid treatment apparatus 200 may further include such units as a first inner cylinder, and a second inner cylinder, implementations which being referred to embodiments 1 and 3, which shall not be described in this embodiment any further.

Embodiment 3

Embodiment 3 of this disclosure provides a liquid treatment apparatus, which is used to treat a liquid.

In Embodiment 3, this disclosure shall be described by taking an inline liquid treatment apparatus having an inlet and an outlet respectively provided at two ends of a housing as an example.

Figure 14:
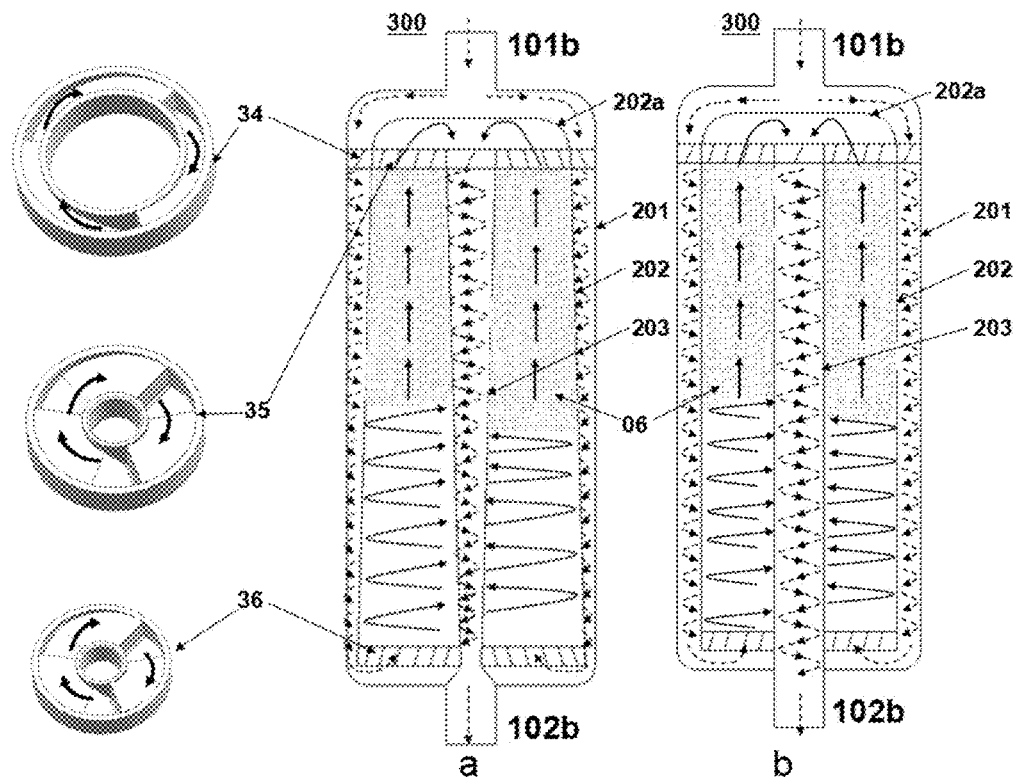
FIG. 14 is an axial cross-sectional view of the liquid treatment apparatus of Embodiment 3 of this disclosure.

In FIG. 14, a is an axial cross-sectional view of the liquid treatment apparatus of Embodiment 3 of this disclosure. As shown in a of FIG. 14, a liquid treatment apparatus 300 may include a housing 201, an inlet 101b, an outlet 102b, a treatment medium 06, and spiral flow-guiding devices 34, 35, 36.

The housing 201 may be of a cylindrical shape and includes an accommodating space inside; the inlet 101b allows a liquid to flow into the accommodating space; the outlet 102b allows the liquid to flow out of the accommodating space; the treatment medium 06 is used for treating the liquid contacting the treatment medium; and the spiral flow-guiding devices 34, 35, 36 make the liquid in the accommodating space flow in a spiral direction around the axial direction of the housing 201 on an/or before contacting the treatment medium.

In this embodiment, the accommodating space may include at least a first portion and a second portion, the first portion being used to set the spiral flow-guiding devices so that the liquid flows in the spiral direction around the axis of the cylindrical shape, and the second portion being used to set the treatment medium to treat the liquid.

In this embodiment, the first portion and the second portion may be arranged to be spaced apart from each other in the axial direction, or may be arranged to be partially overlapped in the axial direction.

In this embodiment, the inlet 101b and the outlet 102b are respectively disposed at two ends of the cylindrical housing 11 in the axial direction, hence, the liquid treatment apparatus 300 becomes an inline filter.

As shown in a of FIG. 14, the liquid treatment apparatus 300 may further include a first inner cylinder 202 and a second inner cylinder 203; wherein, the second inner cylinder 203 is nested in a radial inner side of the first inner cylinder 202.

In this embodiment, the number of the spiral flow-guiding devices may be 3, that is, spiral flow-guiding devices 34, 35, 36. Each of the spiral flow-guiding devices 34, 35, 36 may include a flow-guiding surface and a flow-guiding groove. And each of the spiral flow-guiding devices 34, 35, 36 may have a structure similar to that of the spiral flow-guiding device 33 in Embodiment 2.

In this embodiment, as shown by a of FIG. 14, the spiral flow-guiding device 34 may be disposed at an end of the first inner cylinder 202 close to the inlet 101b and located between the first inner cylinder 202 and the housing 201; the spiral flow-guiding device 35 may be disposed at an end of the first inner cylinder 202 close to the inlet 101b and located between the first inner cylinder 202 and a first inner cylinder 203; and the spiral flow-guiding device 36 may be disposed at an end of the first inner cylinder 202 close to the outlet 102b and located between the first inner cylinder 202 and the first inner cylinder 203.

Furthermore, there may be baffle 202a at the end of the first inner cylinder 202 close to the inlet 101b, which is used for guiding the liquid to the flow-guiding surface and the flow-guiding groove of the spiral flow-guiding device 34.

In this embodiment, as shown in a of FIG. 14, the liquid entering from the inlet 101b is guided by the baffle 202a and flows to the flow-guiding surface and the flow-guiding groove of the spiral flow-guiding device 34; the liquid flowing through the flow-guiding surface and the flow-guiding groove of the spiral flow-guiding device 34 flows in the spiral direction in a first flow path between the first inner cylinder 202 and the housing 201; the liquid reaches the end of the first inner cylinder 202 close to the outlet 102b, then flows in the spiral direction in a third flow path between the first inner cylinder 202 and the second inner cylinder 203 after being guided by the spiral flow-guiding device 36, and contact the treatment medium 06 in the third flow path; the liquid is guided by the spiral flow-guiding device 35 after the liquid reaches the spiral flow-guiding device 35, and flows in a fourth flow path in the second inner cylinder 203 in the spiral direction to the outlet 102b guided by the baffle 202a.

In this embodiment, the third liquid flow path and the fourth liquid flow path may constitute a part of the second liquid flow path inside the first inner cylinder 202.

In a of FIG. 14, the radial cross-sectional area of the first inner cylinder 202 and the radial cross-sectional area of the second inner cylinder 203 may be unevenly distributed in the axial direction. For example, from an end close to the inlet 101b to an end close to the outlet 102b, the radial cross-sectional area of the first inner cylinder 202 gradually increases, and the radial cross-sectional area of the second inner cylinder 203 gradually decreases. Furthermore, the radial cross-sectional area of the first inner cylinder 202 and the radial cross-sectional area of the second inner cylinder 203 may have other distribution forms.

In FIG. 14, b is another axial cross-sectional view of the liquid treatment apparatus of Embodiment 3 of this disclosure. An only difference therebetween is that in b of FIG. 14, the radial cross-sectional area of the first inner cylinder 202 and the radial cross-sectional area of the second inner cylinder 203 are evenly distributed in the axial direction, that is, both the first inner cylinder 202 and the second inner cylinder 203 are of a cylindrical shape.

Figure 15:
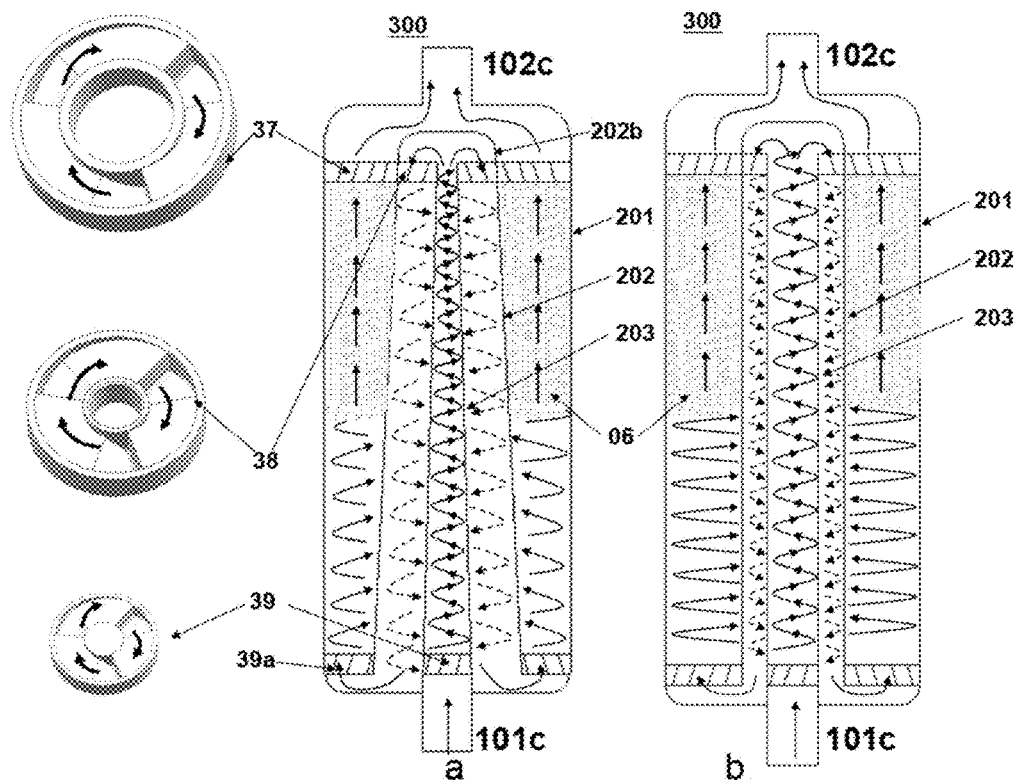
FIG. 15 is another axial cross-sectional view of the liquid treatment apparatus of Embodiment 3 of this disclosure.

In FIG. 15, a is another axial cross-sectional view of the liquid treatment apparatus of Embodiment 3 of this disclosure. As shown in a of FIG. 15, the liquid treatment apparatus 300 may include a housing 201, an inlet 101c, an outlet 102c, a treatment medium 06, and spiral flow-guiding devices 37, 38, 39, 39a.

As shown in a of FIG. 15, the liquid treatment apparatus 300 may further include first inner cylinder 202 and a second inner cylinder 203. The second inner cylinder 203 is nested in a radial inner side of the first inner cylinder 202.

In FIG. 15, each of the spiral flow-guiding devices 37, 38, 39, 39a may have a structure similar to that of the spiral flow-guiding device 33 in Embodiment 2.

In this embodiment, as shown by a of FIG. 15, the spiral flow-guiding device 37 may be disposed at an end of the first inner cylinder 202 close to the outlet 102c and located between the first inner cylinder 202 and the housing 201; the spiral flow-guiding device 38 may be disposed at an end of the first inner cylinder 202 close to the outlet 102c and located between the first inner cylinder 202 and a first inner cylinder 203; the spiral flow-guiding device 39 may be disposed at an end of the first inner cylinder 202 close to the inlet 101c and located within the second inner cylinder 203; and the spiral flow-guiding device 39a may be disposed at an end of the first inner cylinder 202 close to the inlet 101c and located between the first inner cylinder 202 and the housing 201.

Furthermore, there may be baffle 202b at the end of the first inner cylinder 202 close to the outlet 102c, which is used for guiding the liquid to the flow-guiding surface and the flow-guiding groove of the spiral flow-guiding device 38.

In this embodiment, as shown in a of FIG. 15, the liquid entering from the inlet 101c flows in the third liquid flow path in the second inner cylinder 203 in the spiral direction after passing through the spiral flow-guiding device 39; after the liquid reaches the end of the second inner cylinder 203 close to the outlet 102c, it is guided by the baffle 202b to flow to the spiral flow-guiding device 38; after being guided by the spiral flow-guiding device 38, the liquid flows in the spiral direction in the second liquid flow path between the second inner cylinder 203 and the first inner cylinder to the end of the housing 201 close to the inlet 101c, and is guided to the spiral flow-guiding device 39a; after being guided by the spiral flow-guiding device 39a, the liquid flows in the spiral direction in the first liquid flow path between the first inner cylinder 202 and the housing 201 to the spiral flow-guiding device 37; and the liquid is guided by the spiral flow-guiding device 39a and flows to the outlet 102a.

In this embodiment, the third liquid flow path and the fourth liquid flow path may constitute a part of the second liquid flow path inside the first inner cylinder 202.

In a of FIG. 15, the radial cross-sectional area of the first inner cylinder 202 and the radial cross-sectional area of the second inner cylinder 203 may be unevenly distributed in the axial direction. For example, from an end close to the inlet 101c to an end close to the outlet 102c, the radial cross-sectional area of the first inner cylinder 202 gradually decreases, and the radial cross-sectional area of the second inner cylinder 203 gradually decreases. Furthermore, the radial cross-sectional area of the first inner cylinder 202 and the radial cross-sectional area of the second inner cylinder 203 may have other distribution forms.

In FIG. 15, b is another axial cross-sectional view of the liquid treatment apparatus of Embodiment 3 of this disclosure. An only difference therebetween is that in b of FIG. 15, the radial cross-sectional area of the first inner cylinder 202 and the radial cross-sectional area of the second inner cylinder 203 are evenly distributed in the axial direction, that is, both the first inner cylinder 202 and the second inner cylinder 203 are of a cylindrical shape.

In this embodiment, the number of the spiral flow-guiding devices and the number of the second inner cylinders may not be limited to what is described in Embodiment 3, and may be set based on the teachings of this disclosure.

The liquid treatment apparatus of this embodiment may also include such units as a flow reducer, a magnetic unit and/or a baffle, and reference may be made to embodiments 1 and 2 for particular structures and setting manners thereof.

Embodiment 4

Embodiment 4 of this disclosure provides a liquid treatment apparatus, which is used to treat a liquid.

In Embodiment 4, this disclosure shall be described by taking a liquid treatment apparatus having an inlet and an outlet provided at the same end of a housing as an example.

Figure 16:
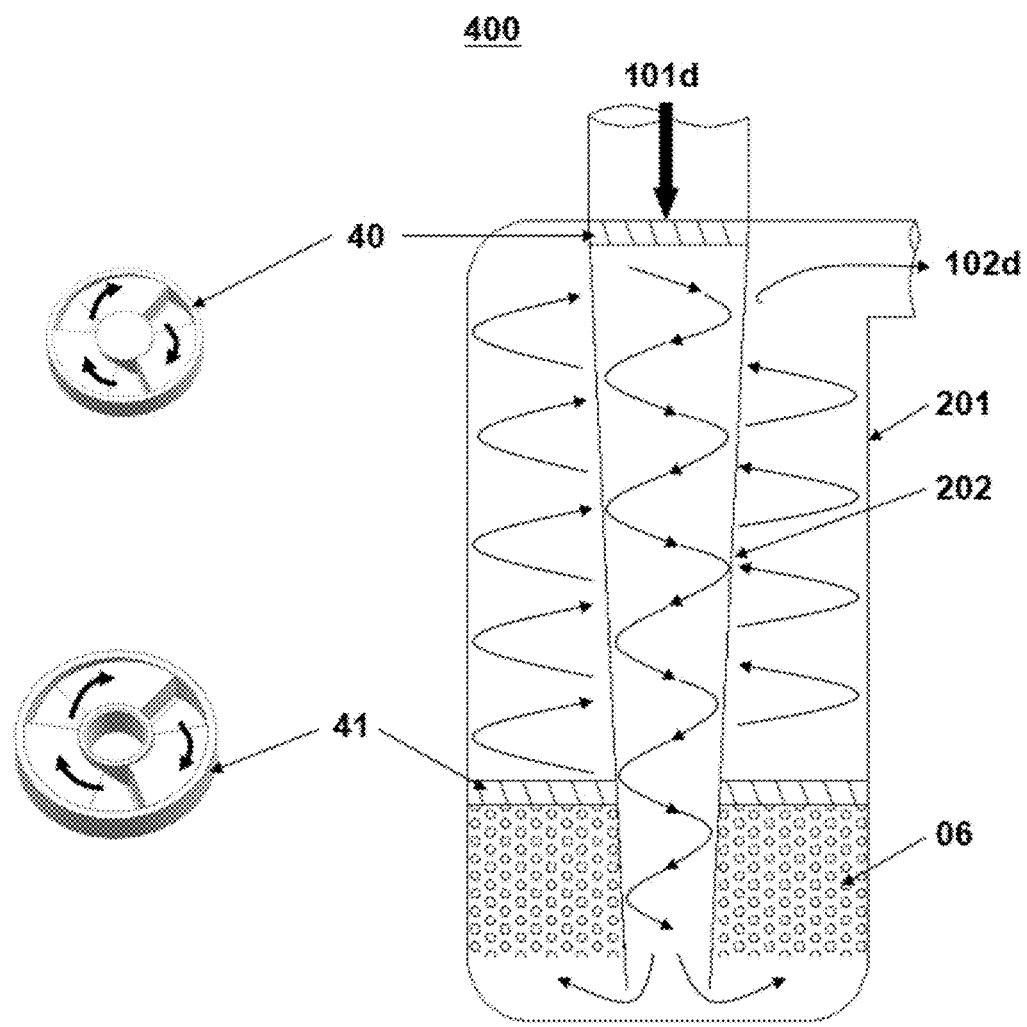
FIG. 16 is an axial cross-sectional view of the liquid treatment apparatus of Embodiment 4 of this disclosure.

In FIG. 16, a is an axial cross-sectional view of the liquid treatment apparatus of Embodiment 4 of this disclosure. As shown in FIG. 16, a liquid treatment apparatus 400 may include a housing 201, an inlet 101d, an outlet 102d, a treatment medium 06, and spiral flow-guiding devices 40, 41.

The housing 201 may be of a cylindrical shape, the inlet 101d may be arranged in the axial direction, and the outlet 102d may be arranged in a direction perpendicular to the axial direction; the treatment medium 06 is used for treating the liquid contacting the treatment medium; and the spiral flow-guiding devices 40, 41 make the liquid in the accommodating space flow in a spiral direction around the axial direction of the housing 201 on and/or before contacting the treatment medium.

In this embodiment, the accommodating space may include at least a first portion and a second portion, the first portion being used to set the spiral flow-guiding devices so that the liquid flows in the spiral direction around the axis of the cylindrical shape, and the second portion being used to set the treatment medium to treat the liquid.

In this embodiment, the first portion and the second portion may be arranged to be spaced apart from each other in the axial direction, or may be arranged to be partially overlapped in the axial direction.

As shown in FIG. 16, the liquid treatment apparatus 400 may further include a first inner cylinder 202. In this embodiment, the number of the spiral flow-guiding devices may be 2, i.e. spiral flow-guiding devices 40, 41. The spiral flow-guiding devices 40, 41 may have a structure similar to that of the spiral flow-guiding device 33 in Embodiment 2.

In this embodiment, as shown in FIG. 16, the spiral flow-guiding device 40 may be disposed at an end of the first inner cylinder 202 close to the inlet 101d and located in the first inner cylinder 202, and the spiral flow-guiding device 41 may be disposed above the treatment medium 06 and located between the first inner cylinder 202 and the housing 201.

As shown in FIG. 16, the liquid flows in the spiral direction after entering from the inlet 101d and passing through the spiral flow-guiding device 40, and then contacts the treatment medium 06. After being treated by the treatment medium 06, the liquid passes through the spiral flow-guiding device 41 and flows in the spiral direction to the outlet 102d.

In this embodiment, the number of the spiral flow-guiding devices and the number of the second inner cylinders may not be limited to what is described in Embodiment 4, and may be set based on the teachings of this disclosure.

The liquid treatment apparatus of this embodiment may also include such units as a flow reducer, a magnetic unit and/or a baffle, and reference may be made to embodiments 1 and 2 for particular structures and setting manners thereof.

In order to prove an effect of the liquid treatment apparatus of this disclosure in liquid treatment, the inventors of the present disclosure performed control experiments on liquid treatment apparatuses of different structures. The test method used in the experiments is based on the German DVGW-W512 protocol (German DVGW-W512 protocol). The main components of a liquid treatment system used in the experiments consist of a water supply tank, a pump, a treatment pipeline, a treatment apparatus, a check valve, a water heater and a drainage pipe. A timer is used to control the flow and to turn water on and off periodically throughout the day. There is an 8-hour break each night, and no water flows through the liquid treatment system. The inventor constructed two identical liquid treatment systems. During the experiments, the two liquid treatment systems were processed in parallel, so two tests may simultaneously be run at each experiment.

The capacity of each water supply tank is 350 gallons. The water supply tank was filled with water during each experiment. The water supply tanks of the two parallel liquid treatment systems have total 700 gallons of water for each experiment. The experiments include intermittently pumping water from the liquid treatment system over a period of one day at a flow rate of 3 liters per minute to simulate the opening and closing of a faucet in a household. In the experiments, water was pumped through the liquid treatment system for a period of more than 21 days. In a case where it is controlled not to perform water treatment, the liquid treatment apparatus may be removed or set to be of bypass. The total volume of the water heater is 14 liters, the power of the heating element thereof is 1200 W, the surface area is 738 $cm^2$, and a total power density is 1.6 $W/cm^2$. All devices of the liquid treatment system were installed according to the manufacturer's instructions.

The experimental water was taken from Toronto water in Canada. The hardness of the water was 180 mg/L of calcium carbonate. The experimental temperature was 80° C., which is the temperature used by the DVGW-W512 protocol.

The amount of scale formed in each experiment may be determined by a combined measurement method of weight measurement and acid dissolution measurement. The scale generated in the water treated by the liquid treatment apparatus may be compared with the scale generated in the water not treated by the liquid treatment apparatus to evaluate a scale reduction ability of the liquid treatment apparatus.

In the experiments, stainless scale tools may be used to scrape solid scale from the heating element. This solid scale may be weighed together with other loose scales.

The liquid treatment apparatus used in the above experiments may have five configurations. All liquid treatment apparatuses have the same internal dimensions: the diameter of 35 mm and the axial length of 200 mm. The amounts of the treatment media set inside each liquid treatment apparatus are identical, which were 60 g. The treatment medium may be a medium based on template-assisted crystallization (TAC) technology, such as a NextScaleStop medium. The flow rates of water passing through the liquid treatment apparatuses were identical, which were 3 liters/minute.

Figure 17:
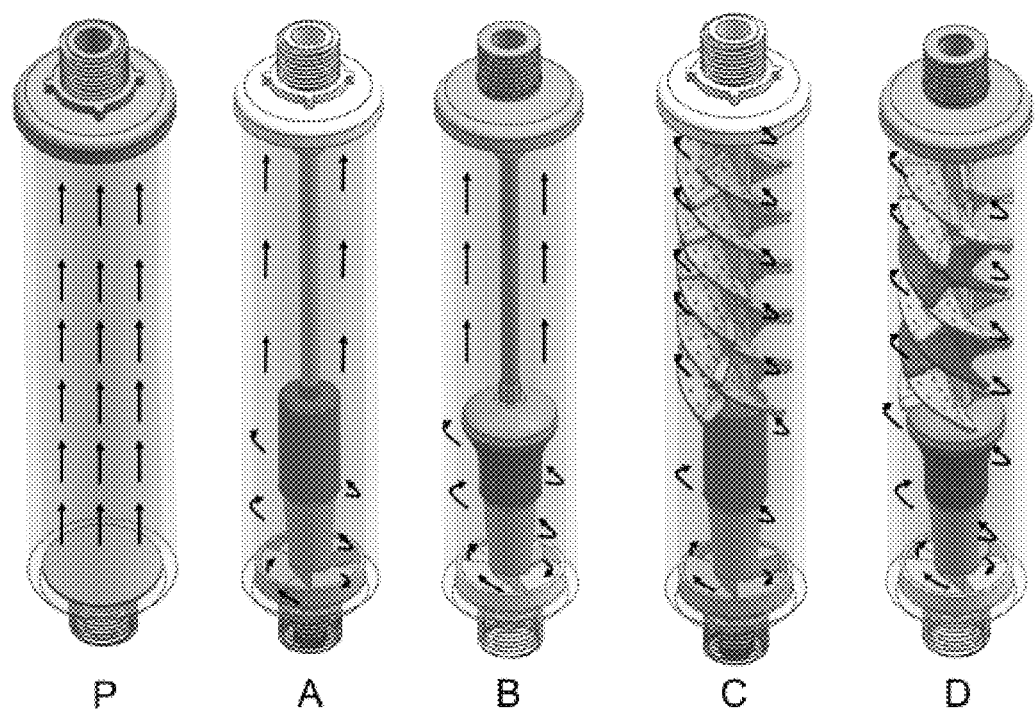
FIG. 17 is a schematic diagram of five types of liquid treatment apparatuses employed in a control experiment.

FIG. 17 is a schematic diagram of five types of liquid treatment apparatuses employed in the experiments. As shown in FIG. 17, structures of the liquid treatment apparatuses are explained as follows:

P: the liquid treatment apparatus in the relevant art, which includes no spiral flow-guiding device inside;

A: the liquid treatment apparatus corresponding to b of FIG. 7, in which an end from which the liquid flows into the liquid treatment apparatus is provided with a spiral flow-guiding device, followed by a flow path of a constant cross section, and finally, a media treatment chamber provided with a processing medium;

B: the liquid treatment apparatus corresponding to b of FIG. 8, in which an end from which the liquid flows into the liquid treatment apparatus is provided with a spiral flow-guiding device, followed by a flow path of a constantly decreasing cross section, and finally, a media treatment chamber with a treatment medium;

C: the liquid treatment apparatus corresponding to a of FIG. 7, in which an end from which the liquid flows into the liquid treatment apparatus is provided with a spiral flow-guiding device, followed by a flow path of a constant cross section, and finally a media processing chamber with a treatment medium provided with a spiral flow baffle;

D: the liquid treatment apparatus corresponding to a of FIG. 8, in which an end from which the liquid flows into the liquid treatment apparatus is provided with a spiral flow-guiding device, followed by a flow path of a constantly decreasing cross section, and finally a media processing chamber with a treatment medium provided with a spiral flow baffle.

The experimental results are shown in the following table:

| Total amounts of scales (mass of CaCO₃, unit: g) | |
| --- | --- |
| Structure of the liquid treatment apparatus | The hardness of the Toronto water was 180 mg/L of calcium carbonate |
| Not treated | 14.48 |
| P | 1.10 |
| A | 0.72 |
| B | 0.58 |
| C | 0.52 |
| D | 0.36 |

It can be seen from the above experiment that the liquid treatment apparatuses A-D in FIG. 17 adopts the structures described in the embodiments of this disclosure, which may make the liquid in the liquid treatment apparatuses flow in a spiral direction, so that part of the natural energy is returned to the liquid, thereby improving a capability of the treatment medium in treating the liquid. For example, the amount of scales generated when the water treated by the liquid treatment apparatuses A-D is heated is significantly less than the amount of scales generated when the water treated by the liquid treatment apparatus P in the relevant art is heated.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. A liquid treatment apparatus, characterized in that the liquid treatment apparatus comprises:
    a housing (05, 11, 201) which is of a cylindrical shape and comprises an accommodating space;
    an inlet for a liquid to flow into the accommodating space;
    an outlet for the liquid to flow out of the accommodating space;
    a treatment medium (06) used for treating the liquid contacting the treatment medium; and
    spiral flow-guiding devices (03, 33, 34, 36, 37, 39, 41) making the liquid in the accommodating space flow in a spiral direction around an axis of the cylindrical shape at least before contacting the treatment medium or in contacting the treatment medium (06);
    wherein the accommodating space at least comprises a first portion and a second portion, the first portion being used to set the spiral flow-guiding devices so that the liquid flows in the spiral direction around the axis of the cylindrical shape, and the second portion being used to set the treatment medium to process the liquid, the liquid treatment apparatus further comprises a first inner cylinder (04, 202) located in the accommodating space,
    at least one of the spiral flow-guiding devices (03, 40) being provided between the first inner cylinder (04, 202) and the housing (05, 201), and the at least one spiral flow-guiding device (03, 34, 36, 37, 39, 41) maintaining the first inner cylinder (04, 202) so that an axis of the first inner cylinder (04, 202) is along the direction of the axis, a first liquid flow path is formed between the first inner cylinder (04, 202) and the housing (05, 201), and a second liquid flow path is formed in a space inside the first inner cylinder;
    wherein the liquid flows in a spiral direction at least in the first liquid flow path, the liquid treatment apparatus further comprises second inner cylinders (203) provided at a radially inner side of the first inner cylinder (04, 202), at least one of the spiral flow-guiding devices (34) being provided between the first inner cylinder (04, 202) and the second inner cylinders (203), a third liquid flow path being formed between the first inner cylinder (04, 202) and the second inner cylinders, a fourth liquid flow path being formed inside the second inner cylinders, and the second liquid flow path comprising the third liquid flow path and the fourth liquid flow path.

2. The liquid treatment apparatus according to claim 1, characterized in that, each of the spiral flow-guiding devices comprises a flow-guiding surface that is inclined with respect to a direction of the axis.

3. The liquid treatment apparatus according to claim 1, characterized in that, the number of the second inner cylinders is more than one, and the second inner cylinders are sequentially nested in a radial direction.

4. The liquid treatment apparatus according to claim 1, characterized in that,
    radial dimensions of the first inner cylinder and the second inner cylinders are evenly or unevenly distributed in an axial direction.

5. The liquid treatment apparatus according to claim 1, characterized in that, the liquid treatment apparatus further comprises a magnetic unit located in the accommodating space and/or outside the housing.

6. The liquid treatment apparatus according to claim 1, characterized in that, the liquid treatment apparatus further comprises a flow reducer for changing a flow cross sections of a liquid flow paths in the liquid treatment apparatus.

* * * * *

UNITED STATES PATENT AND TRADEMARK OFFICE
CERTIFICATE OF CORRECTION

| | | |
|---|---|---|
| PATENT NO. | : 11,058,972 B2 | Page 1 of 1 |
| APPLICATION NO. | : 16/706202 | |
| DATED | : July 13, 2021 | |
| INVENTOR(S) | : Yiu Chau Chau | |

It is certified that error appears in the above-identified patent and that said Letters Patent is hereby corrected as shown below:

In the Claims

Claim 6, Column 16, Line 50 replace "paths" with --path--

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*